Feb. 17, 1953  W. J. SACKETT  2,628,724
DELIVERY FOR PULVERIZED MATERIAL
Filed Aug. 16, 1948  6 Sheets-Sheet 1

Inventor
Walter J. Sackett.
By Thomas W. J. Clark
Attorney

Inventor
Walter J. Sackett
By [signature]
Attorney

Feb. 17, 1953 W. J. SACKETT 2,628,724
DELIVERY FOR PULVERIZED MATERIAL
Filed Aug. 16, 1948 6 Sheets-Sheet 5

Inventor
Walter J. Sackett,
By Thomas W. J. Clark
Attorney

Patented Feb. 17, 1953

2,628,724

UNITED STATES PATENT OFFICE 2,628,724

DELIVERY FOR PULVERIZED MATERIAL

Walter James Sackett, Baltimore, Md., assignor to The A. J. Sackett & Sons Company, Baltimore, Md., a corporation of Maryland Application August 16, 1948, Serial No. 44,478

10 Claims. (Cl. 214—2)

This invention relates to the continuous accurate delivery of predetermined quantities of pulverulent material, such as phosphate rock dust, cement, flour and the like.

Continuous delivery weighing scales have been available for some time, but in the delivery of fine materials thereto, their packing tendencies, and their tendency to entrap air have greatly hampered their delivery in a uniform flow. When such scales are set, means are provided to vary the delivery to them dependent upon the weight of the quantity passing thereover, but should either tightly packed material or a flush of material or very light material, due to carrying air, be presented, the variations in the feed of the material to the weighing conveyor that are required are so great as to seriously interrupt the uniformity of the delivery by that conveyor.

The object of the present invention is to deliver such finely divided material to a continuously delivering weighing conveyor, that the conveyor may function, within its range to deliver that material uniformly.

The invention is illustrated in connection with a fertilizer production plant, and another object is to deliver phosphate rock dust to an acidulating apparatus at a uniform rate, and to interconnect the delivery of the rock to the delivery of acid thereto.

Another object of the invention is to eliminate the air from the dust, and to so control the delivery of the dust that rushes of air therethrough will be completely blocked, and so prevent flushes of dust that so often take place with other apparatus.

Another object of the invention is to utilize agitators such as air jets and vibrators and tight rotary valves to insure both the continuous movement of the dust and its control in that movement.

Another object of the invention is the delivery of a head or supply of dust of uniform admixture with air just ahead of the scale supply entrance.

Another object of the invention is to provide this head or supply continuously and automatically and to provide signals to indicate interruption or trouble and the curing of that trouble or interruption.

Other objects and advantages of the invention will be apparent from the following description and the accompanying drawings forming a part hereof and in which.

In the drawings similar numerals refer to similar parts throughout the several views.

Figure 1:
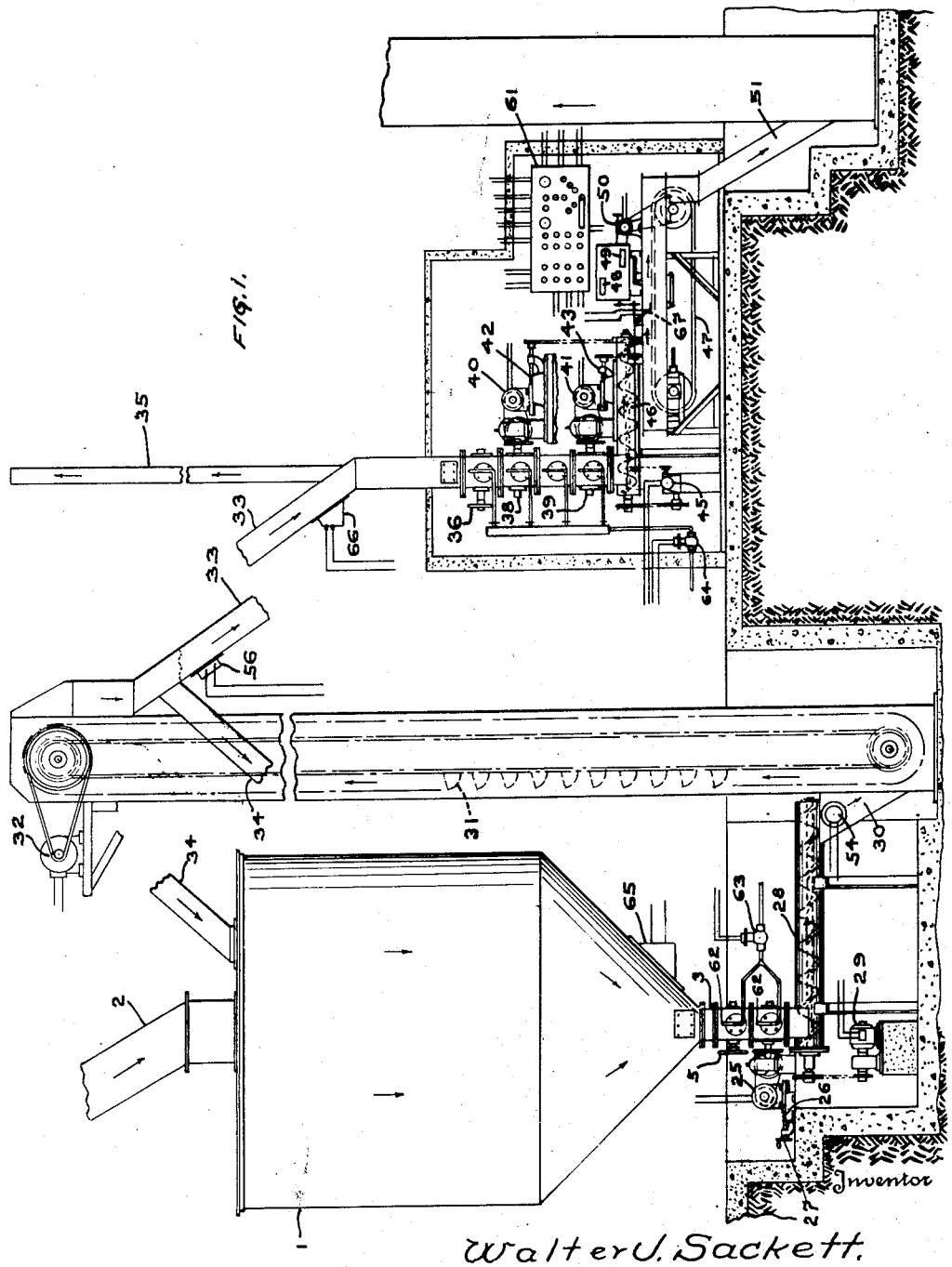
Figure 1 is a front elevational view of the assembly, broken away, of the valve and feed mechanism under the storage bin.

The large storage bin 1 has phosphate rock dust fed thereto intermittently through chute 2 and from this bin it is desired to withdraw the dust continuously while the plant is in operation. The dust is withdrawn through the bottom chute 3 having a valve 4 therein operated by hand wheel 5, the valve being mounted in an inner chute 6 having a side wall 7 permanently forming a part of the inner chute 6 and another side wall 8 held fast by arc plates 9 which may be removed so that the whole valve assembly may be removed through opening 10 in the chute 3 for adjustment and servicing of the bearings 11. The opening 10 is closed by bolt held plate 12. Valve 4 being operable by the hand wheel 5 may also be turned so that the valve could be cleaned through opening 13 in the chute 3 which is closed by large plate 14.

The inner chute 6 passes the material on to the feed valve or wheel 15 in the inner chute 16 within the lower portion of the chute 3. The feed valve 15 has end plates 17 and paddles 18 with adjustable members 19 thereon so that a tight fit with the circumference 20 of the inner chute 16 may be assured. These members 19 close the valve so tightly as to substantially render it air tight. This whole valve may likewise be withdrawn for adjustment and servicing of the bearings 21 through opening 22 in the outer wall of chute 3 which is closed by bolt held plate 23. This valve 15 is rotated by sprocket wheel 24 driven by motor 25 through a change speed mechanism 26 which is operated to adjust the speed as desired through hand wheel 27.

This feed valve 15 passes the material on to to maintain a given head in the feed head bin, substantially continuously driven conveyors between said bins to deliver material from the storage bin to the feed head bin, a substantially horizontal conveyor receiving material in regulable quantity from said feed head bin, air tight vaned rotating means beneath the feed head bin, in the line of the passage of material therefrom to the horizontal conveyor, and means to rotate said vaned means to deliver material in regulable quantity to the horizontal conveyor, means above the level of the desired head in the feed head bin to return material above that level to the storage bin, means to drive said conveyors at related speeds to cause a substantially constant back flow of material from the feed head bin to the storage bin.

6. The apparatus of claim 5 in which means are provided in the feed head bin beneath said return means to indicate when material is below the level of the return means and air blast means, adjacent the material outlet of the storage bin, actuated by said indicating means, to blast air into the material in the storage bin to cause the flow thereof from the storage bin.

7. The apparatus of claim 5 in which said vaned means comprise a plurality of valves beneath the feed head bin, in the line of the passage of material therefrom to the horizontal conveyor, and means to rotate said valves and to vary the speed thereof by the quantity of material delivered from said horizontal conveyor, and air blast means above said valves operable upon a reduction of the supply of material from the horizontal conveyor to blow a blast of air through material above the valves to increase the flow thereof through the valves.

8. The apparatus of claim 5 in which said vaned means comprise an air tight vaned rotating valve beneath the feed head bin, in the line of the passage of material therefrom to the horizontal conveyor, and means to rotate said valve and to vary the speed thereof by the quantity of material delivered from said horizontal conveyor and an air vent in said feed head bin, venting above the head therein and connected to the bin below the head to permit the escape of entrapped air from the material.

9. The apparatus of claim 5 in which vibrators are provided on the bins and an air blast in the storage bin, in the line adjacent the exit therefrom, and means are provided in the feed head bin beneath said return means to indicate when material is below the level of the return means and selective means operable when the material is below the level of the return means, to operate the vibrators together, or the feed head bin vibrator and the air blast, or the two vibrators and air blast together.

10. Pulverized material delivering apparatus characterized by substantially continuous operation to supply continuously a driven weighing conveyor with a substantially constant uniform load of a uniform admixture of material with air comprising in combination a storage bin to which pulverized material is fed, a feed head bin, to which material is fed from the storage bin to maintain a given head in the feed head bin, the feed head bin having an opening adjacent its top, a return chute extending downwardly from said opening to the storage bin to return material accumulating above the level of said opening to the storage bin, conveyors between said bins to deliver material from the storage bin to the feed head bin and operating substantially continuously, a substantially horizontal conveyor receiving material in regulable quantity from said feed head bin, air tight vaned continuously rotating valves between said feed head bin and said horizontal conveyor to maintain the material with uniform admixture with air, means to drive said valves and horizontal conveyor at related speeds to maintain a substantially constant flow of material from the horizontal conveyor, a weighing conveyor receiving material from said horizontal conveyor and controlling the speeds of the valves and horizontal conveyor in accordance with the weight of material delivered to the weighing conveyor.

WALTER JAMES SACKETT.

REFERENCES CITED

The following references are of record in the file of this patent:

UNITED STATES PATENTS

| Number | Name | Date |
|---|---|---|
| 635,318 | Heavey | Oct. 24, 1899 |
| 833,761 | Stevens | Oct. 23, 1906 |
| 1,143,634 | Lane | June 22, 1915 |
| 1,301,978 | Schaffer | Apr. 29, 1919 |
| 1,324,930 | Schaffer | Dec. 16, 1919 |
| 1,914,341 | Larsen | June 13, 1933 |
| 1,971,852 | Goebels | Aug. 28, 1934 |
| 2,381,505 | Lindholm | Aug. 7, 1945 |

FOREIGN PATENTS

| Number | Country | Date |
|---|---|---|
| 806,266 | France | Dec. 11, 1936 |

Figures 2, 3:
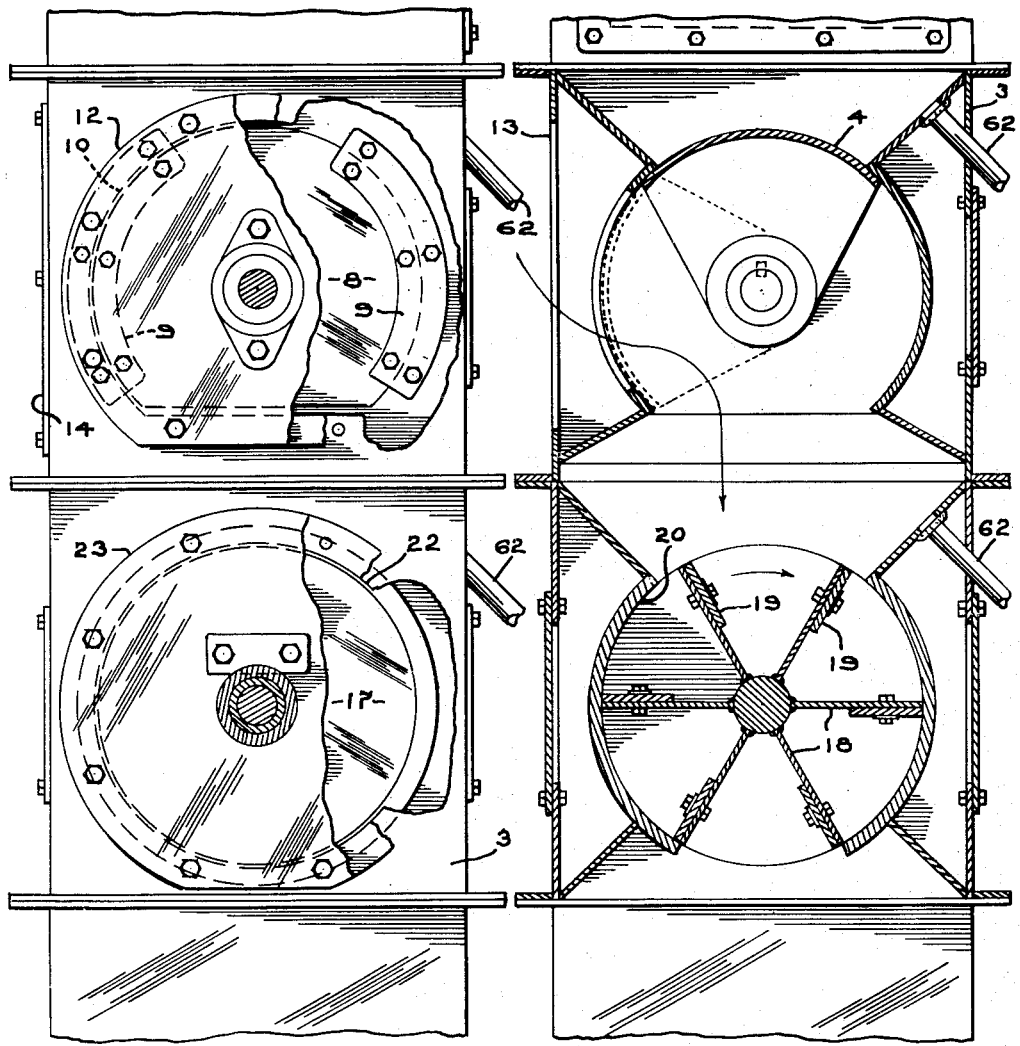
Figure 3 is a transverse cross-sectional view of these same members.
Figure 4:
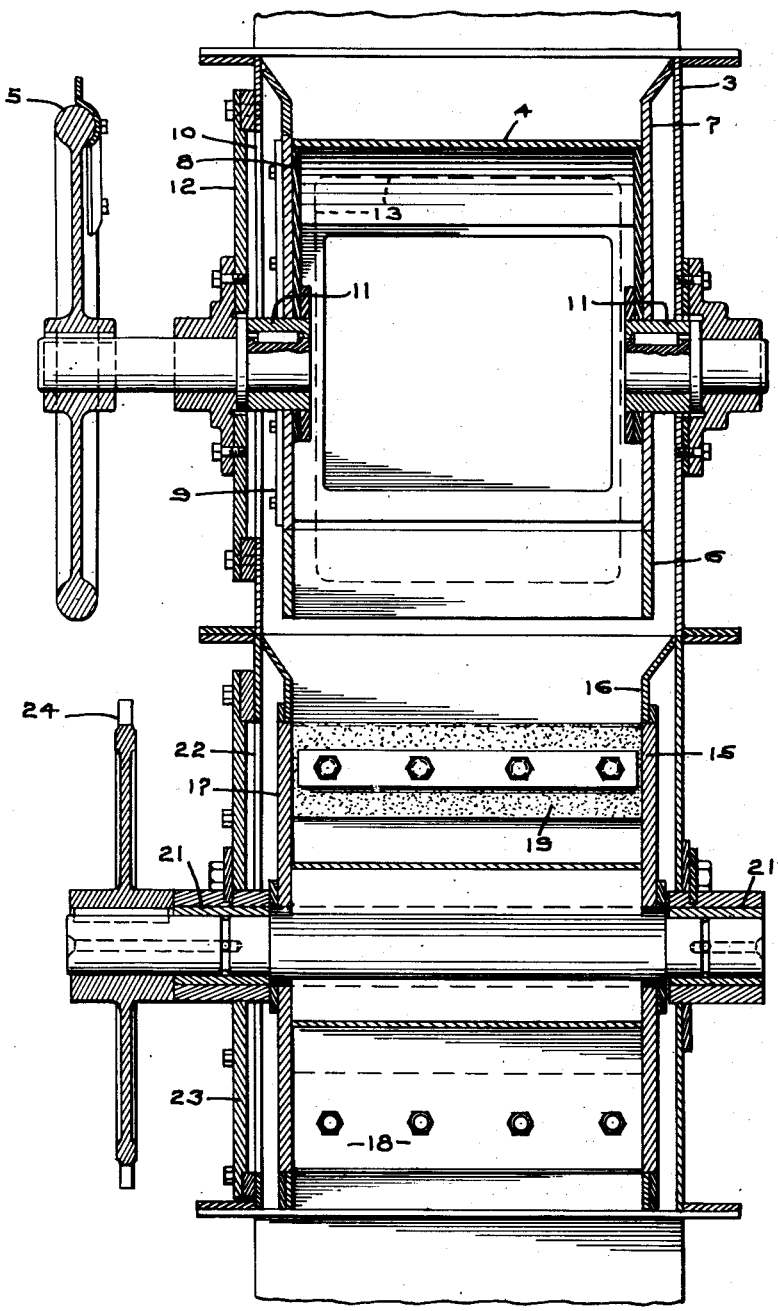
Figure 4 is a vertical sectional view of these same members.
Figure 5:
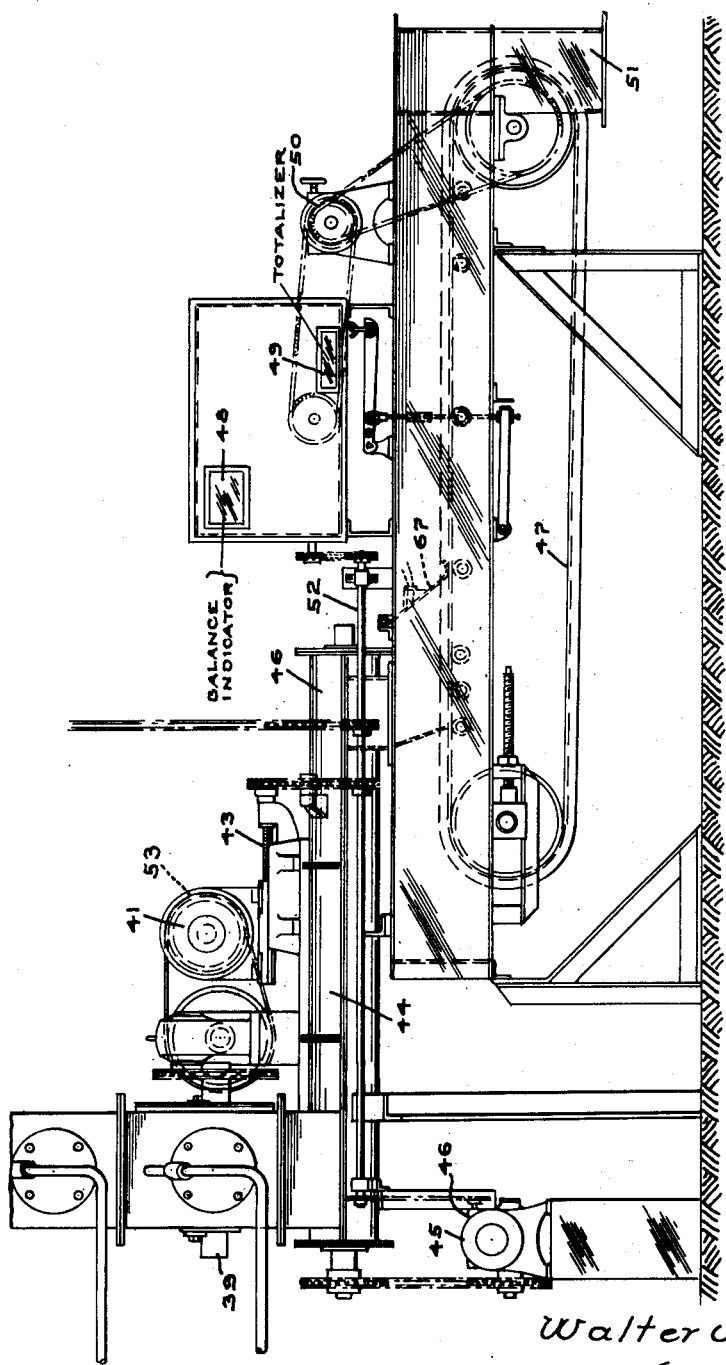
Figure 5 is a side elevational view of the continuous weighing scale and a portion of the feed mechanism leading thereto.
Figure 6:
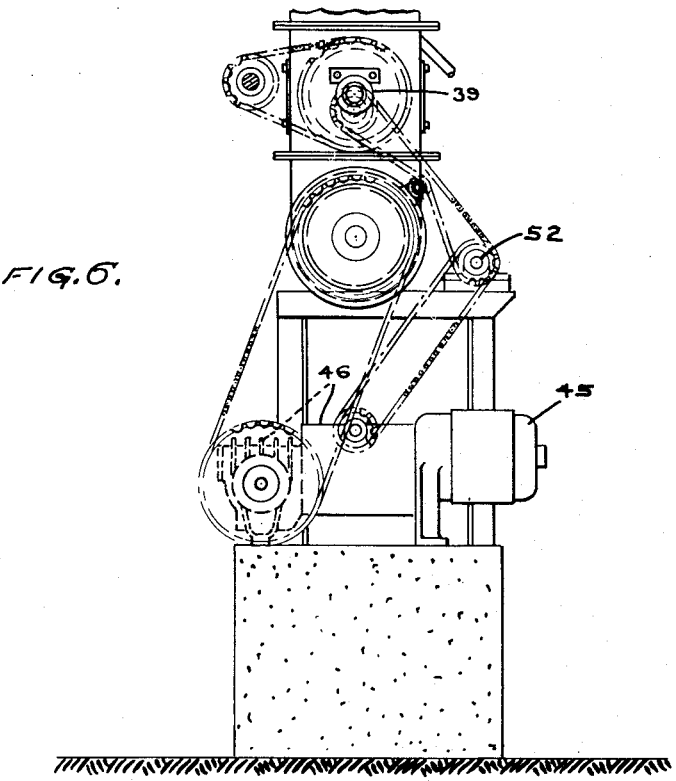
Figure 6 is an end elevational view of the feed mechanism of the scale.
Figure 7:
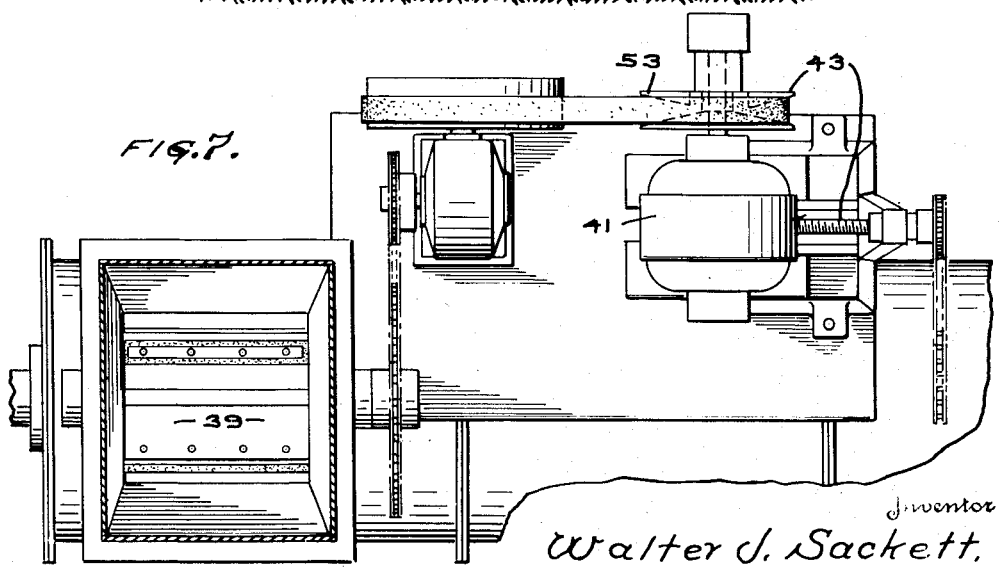
Figure 7 is a top plan view partly in section of the feed mechanism for the scale and its variable speed drive.
Figure 8:
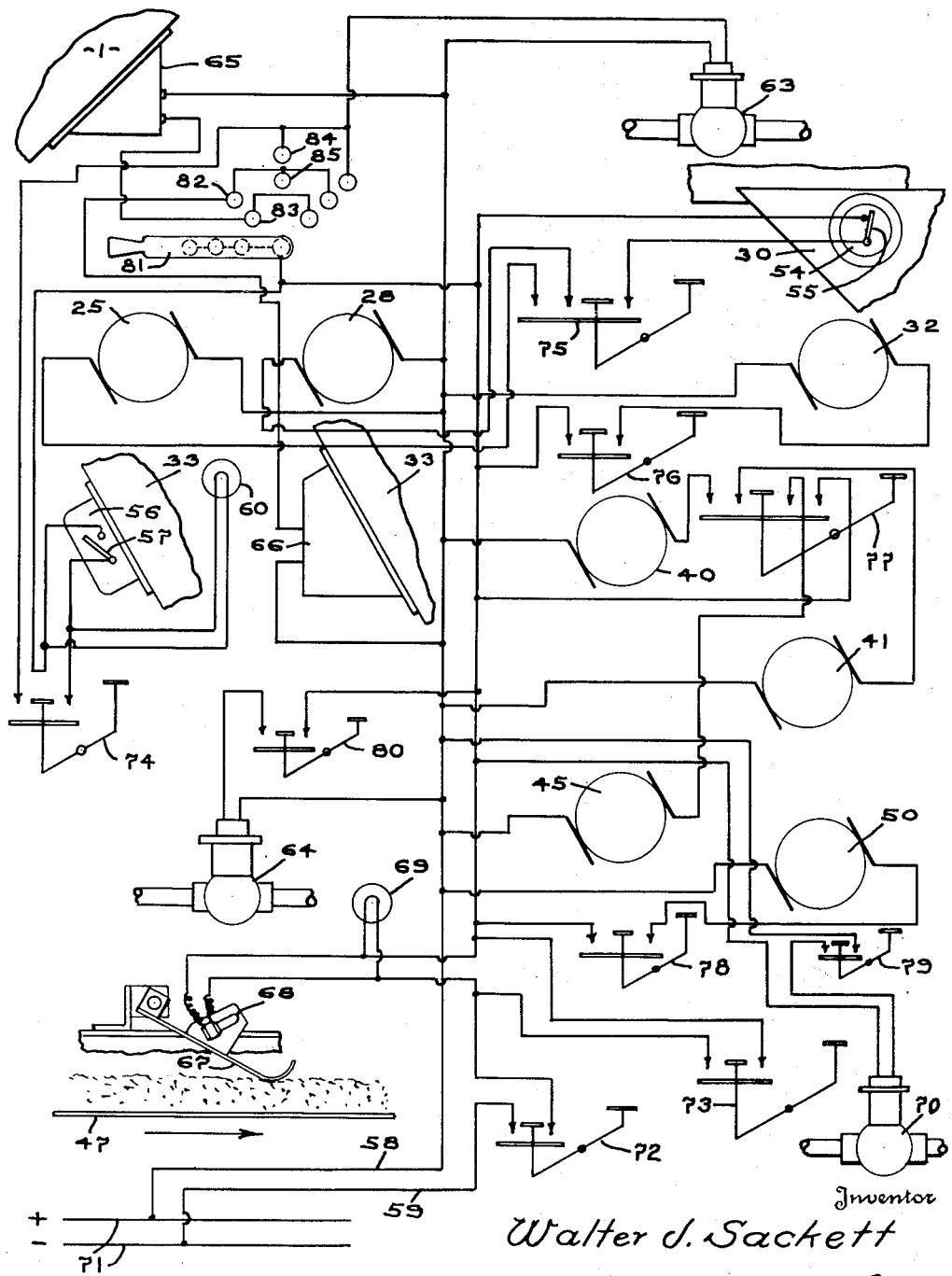
Figure 8 is a schematic view of the electric wiring diagram operating the above mechanism.

Feb. 17, 1953  A. L. STONE  2,628,725
APPARATUS FOR RACKING PIPE IN DERRICKS
Filed Nov. 3, 1951  4 Sheets-Sheet 1
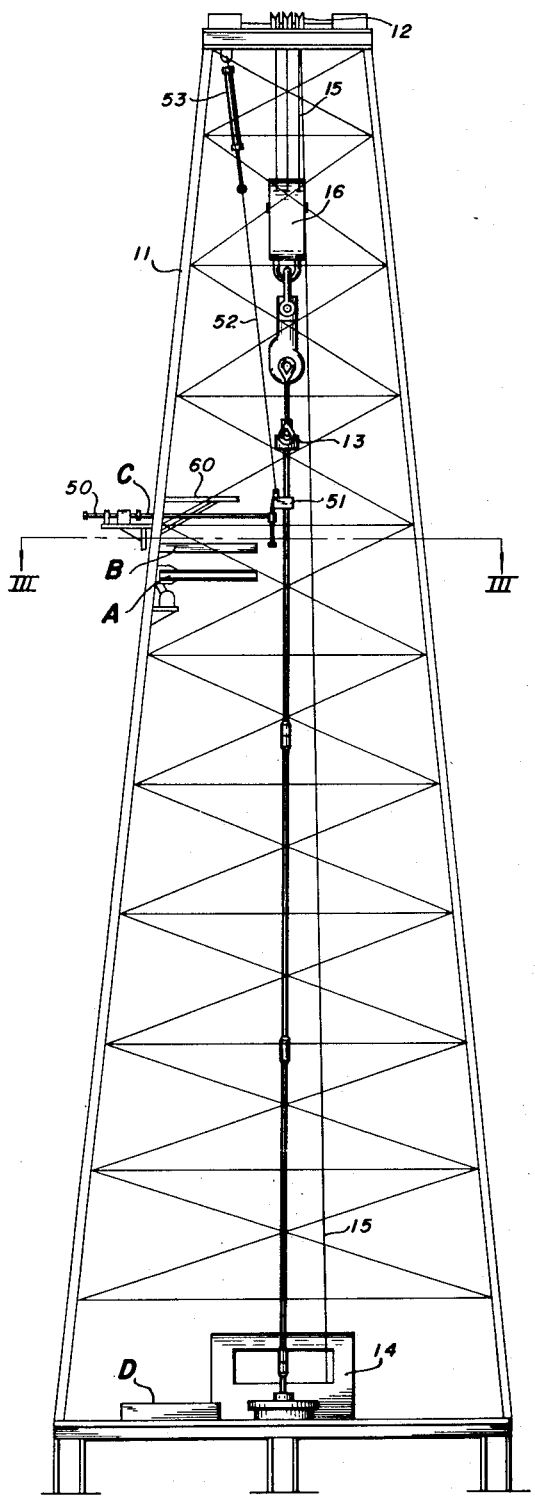
FIG. 1.
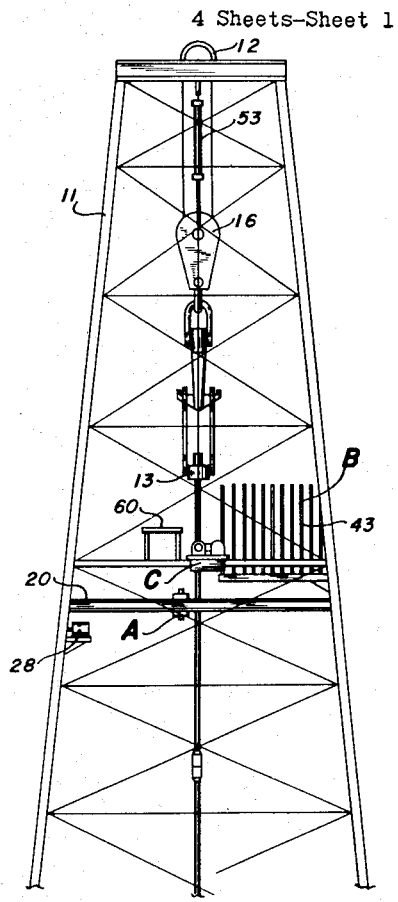
FIG. 2.
INVENTOR.
Albert L. Stone,
BY
ATTORNEY.